United States Patent
Valasek et al.

(10) Patent No.: US 9,401,923 B2
(45) Date of Patent: Jul. 26, 2016

(54) ELECTRONIC SYSTEM FOR DETECTING AND PREVENTING COMPROMISE OF VEHICLE ELECTRICAL AND CONTROL SYSTEMS

(71) Applicants: Christopher Valasek, Pittsburgh, PA (US); Charles Miller, Wildwood, MO (US)

(72) Inventors: Christopher Valasek, Pittsburgh, PA (US); Charles Miller, Wildwood, MO (US)

(*) Notice: Subject to any disclaimer, the term of this patent is extended or adjusted under 35 U.S.C. 154(b) by 59 days.

(21) Appl. No.: 14/147,075

(22) Filed: Jan. 3, 2014

(65) Prior Publication Data

US 2015/0113638 A1 Apr. 23, 2015

Related U.S. Application Data (60) Provisional application No. 61/894,651, filed on Oct. 23, 2013.

(51) Int. Cl.
| | |
|---|---|
| *G06F 11/30* | (2006.01) |
| *G06F 21/55* | (2013.01) |
| *G06F 21/85* | (2013.01) |
| *H04L 29/06* | (2006.01) |

(52) U.S. Cl.
CPC ........ *H04L 63/1408* (2013.01); *H04L 63/1441* (2013.01)

(58) Field of Classification Search
CPC ......... G06F 11/30; G06F 21/55; G06F 21/85; G06F 21/604; H04L 63/14; H04L 67/12; H04L 2012/40215
USPC ................ 726/2–3, 11, 16, 22–24, 26, 27, 34
See application file for complete search history.

(56) References Cited

U.S. PATENT DOCUMENTS

| | | | |
|---|---|---|---|
| 8,955,130 B1* | 2/2015 | Kalintsev et al. | 726/23 |
| 2009/0082912 A1* | 3/2009 | Melman | B60T 8/885 701/1 |
| 2012/0077430 A1* | 3/2012 | Stuebing et al. | 455/39 |
| 2013/0145482 A1* | 6/2013 | Ricci et al. | 726/28 |
| 2015/0020152 A1* | 1/2015 | Litichever et al. | 726/1 |
| 2015/0271201 A1* | 9/2015 | Ruvio | H04L 63/1408 726/23 |

OTHER PUBLICATIONS

Ishtiaq Rouf et al., "Security and Privacy Vulnerabilities of In-Car Wireless Networks: A Tire Pressure Monitoring System Case Study", pp. 1-16.

Charlie Miller et al., "Adventures in Automotive Networks and Control Units", pp. 1-101.

(Continued)

*Primary Examiner* — Joseph P Hirl
*Assistant Examiner* — Kalish Bell
(74) *Attorney, Agent, or Firm* — Buchanan Ingersoll & Rooney PC (57) ABSTRACT

A method for detecting threats or attacks on an automobile network, the automobile network connected to a plurality of electronic components and an attack monitoring unit including a processor, the method including: monitoring, by the processor of the attack monitoring unit, data messages transmitted on the automobile network; determining, by the processor of the attack monitoring unit, whether at least one data message among the data messages transmitted on the mobile network is a threat to one or more of the plurality of electronic components on the automobile network; and when it is determined, by the processor, that the at least one data message is a threat, performing at least one action based on the threat.

25 Claims, 6 Drawing Sheets

(56) References Cited

OTHER PUBLICATIONS

Karl Koscher et al., "Experimental Security Analysis of a Modern Automobile", 2010 IEEE Symposium on Security and Privacy; 2010, pp. 1-16.

Stephen Checkoway et al., "Comprehensive Experimental Analyses of Automotive Attack Surfaces", pp. 1-16.

Maxim Raya et al., "Securing vehicular ad hoc networks", Journal of Computer Security 15; 2007, pp. 39-68, IOS Press.

Yilin Zhao et al., "Telematics: Safe and Fun Driving", IEEE Intelligent Systems, 2002, pp. 10-14.

Dennis K. Nilsson et al., "A Roadmap for Securing Vehicles against Cyber Attacks", pp. 1-3.

Rob Vandenbrink, "Dude Your Car Is PWND", http://isc.sans.edu, pp. 1-18.

Marko Wolf et al., "Security in Automotive Bus Systems", pp. 1-13, escrypt GmbH, Bochum, Germany.

Marko Wolf et al., "State of the Art: Embedding Security in Vehicles", EURASIP Journal on Embedded Systems, Apr. 13, 2007, vol. 2007, pp. 1-16, Hindawi Publishing Corporation.

Mario Krucker et al., "Communication with a Toyota Prius: Decoding of the CAN Protocol and Development of a Graphical Interface", Autumn Term 2009, pp. 1-29, ETH: Eidgenossische Technische Hochschule Zurich Swiss Federal Institute of Technology Zurich.

* cited by examiner

FIG. 6

ELECTRONIC SYSTEM FOR DETECTING AND PREVENTING COMPROMISE OF VEHICLE ELECTRICAL AND CONTROL SYSTEMS

CROSS-REFERENCE TO RELATED APPLICATIONS

This application claims the benefit of U.S. Provisional Application No. 61/894,651, filed on Oct. 23, 2013, the contents of which are incorporated herein by reference in their entirety.

FIELD

The present system and method relate to detecting threats or attacks on an automobile network. Specifically, a method for detecting and stopping cyber-attacks occurring on a Controller Area Network (CAN), thereby increasing the safety and integrity of the automotive network.

BACKGROUND

Modern automobiles have moved from mere mechanical devices to systems composed of a number of electronic components, including upwards of 50 electronic control units (ECUs) networked together. The overall safety of the vehicle relies on near real-time communication between the various ECUs that are connected to the automobile network. While communicating with each other, ECUs are responsible for detecting crashes, detecting skids, performing anti-locking of the brakes, automatic parking, etc.

Typically, ECUs are networked together on one or more buses based on the CAN standard. The ECUs communicate with one another by sending CAN messages. The CAN messages are broadcast to all components on the bus and each component decides whether it is intended for them. However, there is no source identifier or authentication built into the CAN messages. Because of these two facts, it is easy for components to both sniff the CAN network as well as masquerade as other ECUs and send CAN messages. It is also possible for the ECUs to be attacked, remotely and with both short-term and long-term physical access, in order for malicious code to be run on them. Once an ECU has malicious code running on it, the ECU can send messages on the CAN network and cause the automobile to behave abnormally, in some cases putting the driver in physical harm. Depending on the electronics in the automobile, it is possible for malicious code to make many changes to the operation of the car, such as causing it to brake, turn the steering wheel, change the readout of the speedometer, kill the engine, etc.

SUMMARY

We provide a method for detecting threats or attacks on an automobile network, the automobile network connected to a plurality of electronic components and an attack monitoring unit including a processor, the method including: monitoring, by the processor of the attack monitoring unit, data messages transmitted on the automobile network; determining, by the processor of the attack monitoring unit, whether at least one data message among the data messages transmitted on the automobile network is a threat to one or more of the plurality of electronic components on the automobile network; and when it is determined, by the processor, that the at least one data message is a threat, performing at least one action based on the threat.

We provide a non-transitory computer-readable storage medium, storing instructions which when executed by a computer processor perform a method for detecting threats or attacks on an automobile network, the automobile network connected to a plurality of electronic components and an attack monitoring unit including a processor, the method including: monitoring data messages transmitted on the automobile network; determining whether at least one data message among the data messages transmitted on the automobile network is a threat to one or more of the plurality of electronic components on the automobile network; and when it is determined that the at least one data message is a threat, performing at least one action based on the threat.

We provide an attack monitoring apparatus for detecting threats or attacks on an automobile network of an automobile, the automobile network connected to a plurality of electronic components, the attack monitoring apparatus including: a processor; a memory; a communication interface configured to send and receive data messages, wherein the processor is configured to monitor data messages transmitted on the automobile network, wherein the processor is configured to determine whether at least one data message among the data messages transmitted on the automobile network is a threat to one or more of the plurality of electronic components on the automobile network, and wherein when it is determined by the processor that the at least one data message is a threat, at least one action is performed based on the threat.

These and other exemplary features and advantages of particular embodiments of the method, system, and non-transitory computer readable medium for detecting threats or attacks on an automobile network will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the invention. Rather, the ensuing description of the embodiments will provide those skilled in the art with an enabling description for implementing embodiments of the disclosed methods and systems. Various changes may be made in the function and arrangement of elements without departing from the spirit and scope of the invention as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

The method, system, and non-transitory computer-readable medium for detecting threats or attacks on an automobile network will now be described by reference to the accompanying drawings in which like elements are described with like figure numbers. It should be noted that the claimed invention is not limited to these particular embodiments but rather fully encompasses variations and modifications which may occur to those skilled in the art.

The present disclosure provides a method, apparatus, and non-transitory computer-readable medium that can detect malicious attacks on the CAN of the automobile and take action when the attacks are detected, for example alerting the driver, stopping the car in a safe manner, etc. The method, apparatus, and non-transitory computer-readable medium can help keep the passengers of the vehicles safe even if a malicious actor is trying to attack their vehicle and cause them harm.

CAN messages contain an identification data (ID) portion and a data portion. The CAN ID signifies the type of data to expect and also acts as a priority field. The data is typically 0 to 8 bytes in length, but can have a length of any amount of bytes. The data and CAN IDs are typically proprietary and will vary depending on the make, model, and year of the vehicle.

Figure 1:
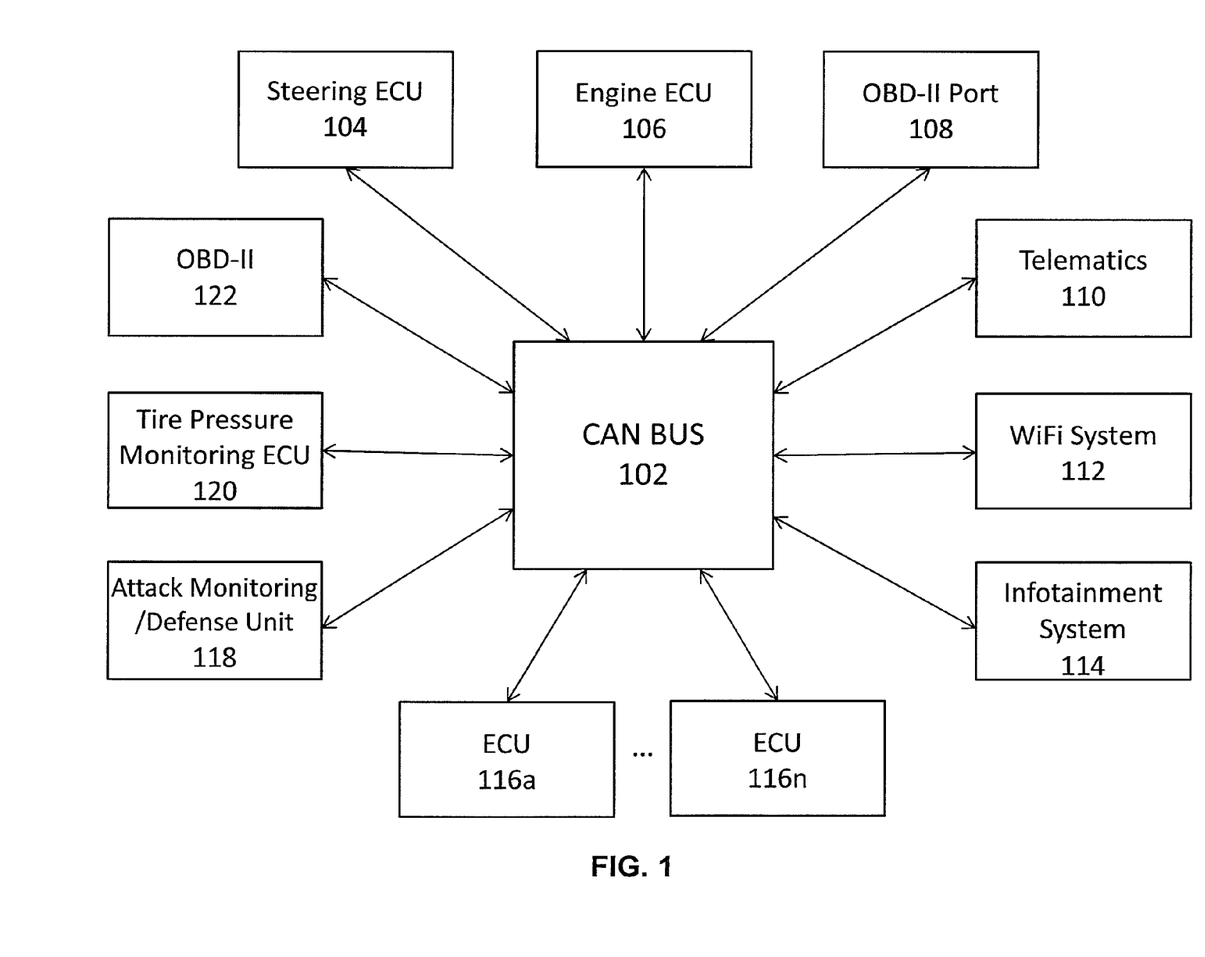
FIG. 1 illustrates a high level diagram of a system architecture that may be employed in accordance with an exemplary embodiment.

FIG. 1 shows an exemplary embodiment of a system architecture that may be employed in detecting threats or attacks on an automobile network. In FIG. 1, the automobile network is the CAN BUS 102, which is connected to a plurality of electronic components. In FIG. 1, electronic components that can be connected to the CAN BUS 102 include: a steering ECU 104, an engine ECU 106, an On-Board Diagnostic (OBD-II) port 108, telematics 110, a WiFi system 112, an infotainment system 114, additional ECUs 116a-116n, a tire pressure monitoring ECU 120, and an OBD-II unit 122. The components connected to the CAN BUS 102 in FIG. 1 are exemplary, and only some of these components may be connected to the CAN BUS 102 or different electronic components can be connected to the CAN BUS 102.

In FIG. 1, an attack monitoring/defense unit 118 (hereinafter "attack monitoring unit") is also connected to the CAN BUS 102. The attack monitoring unit 118 is the device that monitors the CAN messages and determines if they are abnormal or malicious. For example, the attack monitoring unit 118 will automatically monitor, alert, and potentially stop malicious attacks directed at various ECUs in the vehicle. The attack monitoring unit 118 may be placed directly on the CAN BUS 102 as a separate device. For example, the attack monitoring unit 118 can be wired directly into one or many of the automotive CAN networks in the vehicle. In this scenario, the attack monitoring unit 118 would act as an independent ECU. The attack monitoring unit 118 can also be part of an existing ECU. For example, code for monitoring attacks can be added to any existing ECU. The attack monitoring unit 118 can also be a removable device inserted (e.g., plugged) into the ODB-II port 108. ODB-II ports have been mandated in vehicles since 1996, and provide access to at least one CAN BUS on an automobile.

The attack monitoring unit 118 may be preloaded with certain functionality, learn baseline behavior and alert on detected anomalies, or have a combination of these two features. The attack monitoring unit 118 can detect attacks and alert the driver if something anomalous occurs, or completely restrict functionality of the automobile depending on the current state of the automobile and configuration of the attack monitoring unit 118 and/or the automobile.

Figure 2:
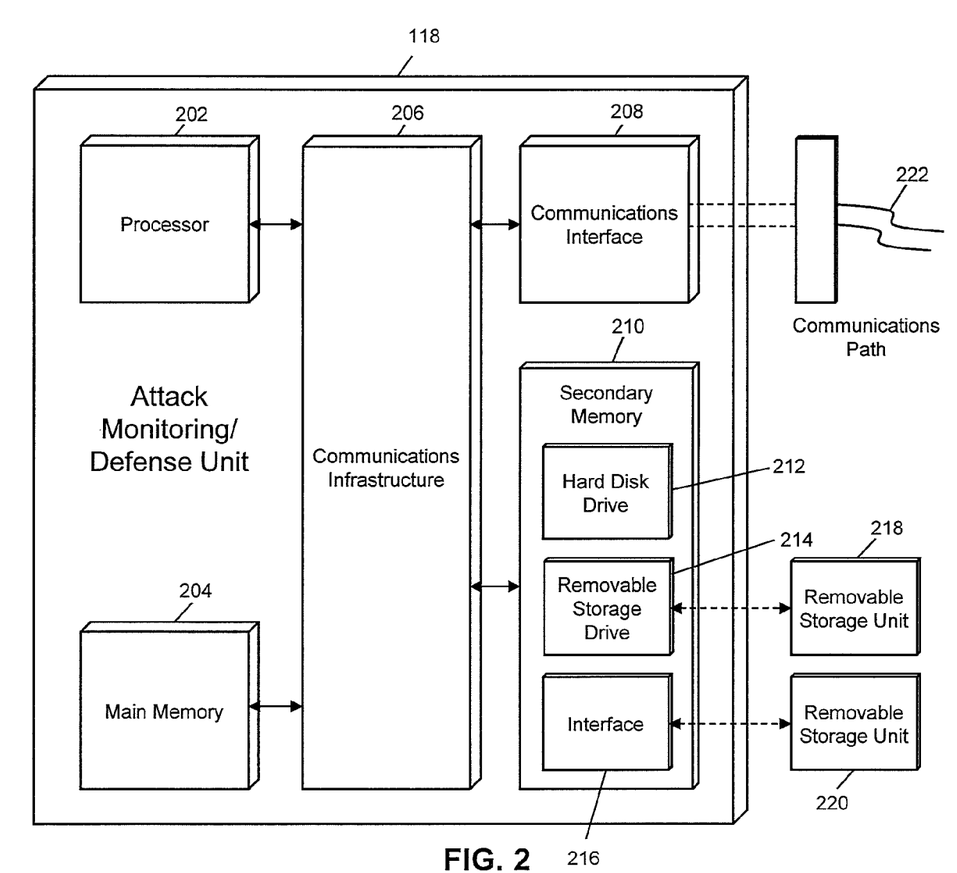
FIG. 2 is a block diagram illustrating a hardware architecture of an attack monitoring/defense unit in accordance with an exemplary embodiment.
Figure 4:
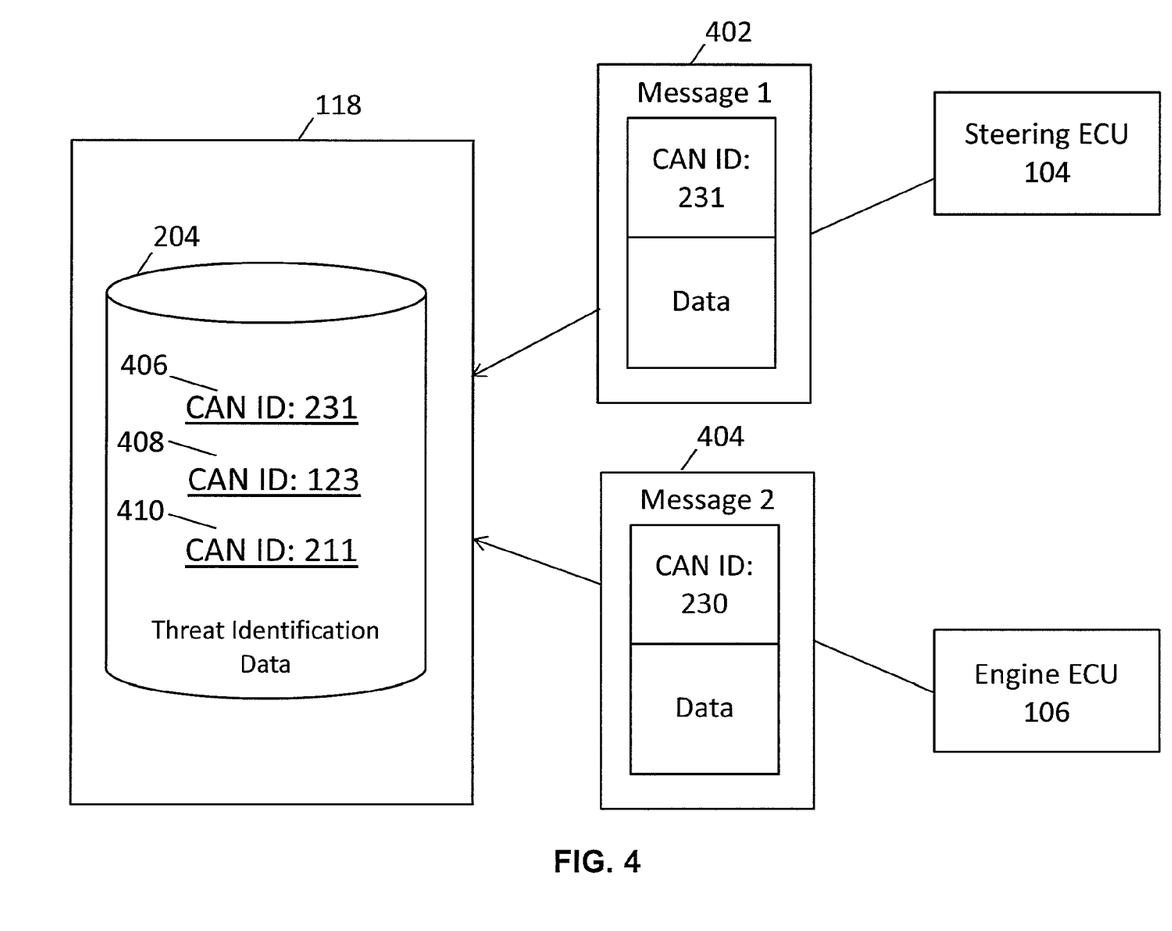
FIG. 4 is a block diagram illustrating a hardware architecture that may be employed in accordance with an exemplary embodiment.

As shown in FIG. 2, the attack monitoring unit 118 includes a processor 202 and a memory 204. The attack monitoring unit 118 can also include a communication interface 208 configured to send and/or receive data messages. In an exemplary embodiment, the processor 202 is configured to monitor data messages (for example data messages 402, 404) transmitted on the automobile network 102. In an exemplary embodiment, the processor is configured to determine whether at least one data message (e.g., data message 402) among the data messages (e.g., data messages 402, 404) transmitted on the automobile network 102 is a threat to one or more of the plurality of electronic components (e.g., the steering ECU 104, the engine ECU 106, the OBD-II port 108, the telematics 110, the WiFi system 112, the infotainment system 114, the tire pressure monitoring ECU 120, the OBD-II unit 122, the additional ECUs 116a-116n, etc.) on the automobile network 102. In an exemplary embodiment, when it is determined by the processor 202 of the attack monitoring unit 118 that the at least one data message (e.g., data message 402) is a threat, at least one action is performed based on the threat. The at least one action can be, for example, alerting the driver to the anomaly/attack or performing an action with the vehicle. For example, the driver can be alerted by an audible alert, a message appearing on the instrument cluster, flashing lights, etc. The action performed by the vehicle can be any physical action, for example, applying the brakes and immobilizing the vehicle, killing the engine, disabling all communications on the CAN network, etc. In an exemplary embodiment, the components and/or software of the attack monitoring unit can be divided between two or more devices. The architecture of the attack monitoring unit 118 will be discussed in further detail later below.

The attack monitoring unit 118 can detect abnormal and malicious CAN traffic on the CAN BUS 102 in a number of different ways. One way the attack monitoring device 118 can detect abnormal and malicious CAN traffic on the CAN BUS 102 is by static pattern matching. In an exemplary embodiment, a set of rules can be built-in or loaded onto the attack monitoring device 118 which would detect attacks based on a particular pattern in the CAN traffic along with the environmental conditions at that time. In an exemplary embodiment, the set of rules can be stored in the memory 204 or another memory of the attack monitoring unit 118. Examples of patterns include: a particular CAN ID seen during a particular environmental condition, i.e. a message with CAN ID: 231 seen when the automobile is not in park; a particular byte of a CAN message taking a particular value, i.e. a message with CAN ID: 123 has a fourth byte greater than 0×80 when the car is driving faster than 20 mph; a particular sequence of CAN traffic, i.e. a message with CAN ID: 223 seen before a message with CAN ID: 211; and a particular message is seen at a rate that exceeds a prescribed limit, i.e. a message with CAN ID: 072 is seen more than 10 times per second.

FIG. 4 shows an example of static pattern matching used by the attack monitoring unit 118 to detect threats or attacks.

FIG. 4 shows CAN messages 402 and 404 being transmitted from one or more electronic components, such as the steering ECU 104 and the engine ECU 106, for example. Any number of messages can be sent by any kind/type of ECU or other device on the CAN BUS 102. The CAN messages 402 and 404 are received in the memory 204 of the attack monitoring unit 118. The memory 204 stores threat identification data. For example, the memory stores at least one CAN ID (for example CAN IDs 406, 408, and 410) that is a CAN ID associated with a threat. The attack monitoring unit 118 can then compare the received CAN messages 402 and 404 with the stored CAN IDs 406, 408, and 410 to determine if there is a match between one of the CAN IDs of the received messages and the stored CAN IDs. If there is a match, it is determined that the matching CAN ID in the received message is associated with an abnormal or malicious message. For example, in FIG. 4, because CAN ID: 231 in CAN message 402 matches with CAN ID 406 (CAN ID: 231) stored in the memory 204, it is determined that CAN message 402 is malicious or abnormal based upon the CAN ID: 231 being previously registered and identified as being associated with an abnormal or malicious message.

Another way the attack monitoring device 118 can detect abnormal and/or malicious CAN traffic on the CAN BUS 102 is by dynamic pattern matching. In dynamic pattern matching, a baseline of behavior will be established for the vehicle by the attack monitoring unit 118. Any traffic falling outside of this baseline will be detected, and identified as abnormal or malicious. Examples of traffic falling outside of the baseline include, for example: a particular CAN ID is seen that has never been observed, i.e. a message with CAN ID: 119 is seen for the first time; the data for a particular message has values never before observed, i.e. a message with CAN ID: 111 has a third byte with value 0xff when normally the byte value is always 0x00; the rate at which a particular message is seen changes, i.e. a message with CAN ID: 112 is seen 40 times in a second when normally it is seen only two times per second.

Figure 5:
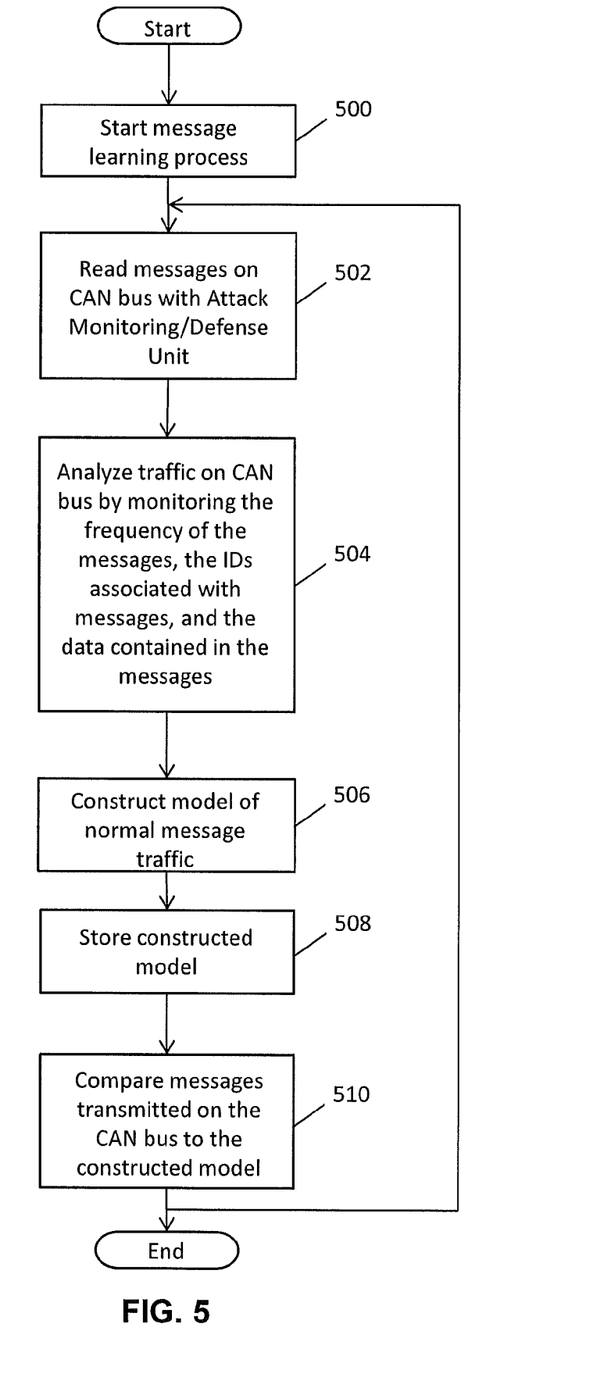
FIG. 5 is a flow chart illustrating an exemplary method of an embodiment.

FIG. 5 shows an exemplary method that can include dynamic pattern matching. In step 500, the attack monitoring unit 118 starts a message learning process. In step 502, messages that are transmitted on the CAN BUS 102 are read by the attack monitoring unit 118. In step 504, the attack monitoring unit 118 analyzes the traffic that is on the CAN BUS 102 by monitoring and identifying the frequency of the CAN messages, the CAN IDs associated with the CAN messages, and the data contained in the CAN messages. In step 506, the attack monitoring unit 118 constructs a model of normal traffic based on the read messages. In step 508, the attack monitoring unit 118 stores the constructed model of normal traffic. The constructed model of normal traffic can be stored, for example, in the memory 204 or another memory. In step 510, messages transmitted on the CAN BUS 102 are compared to the constructed model of normal traffic. Based on the comparison, abnormal or malicious messages can be identified, and remedial action can be taken.

Figure 6:
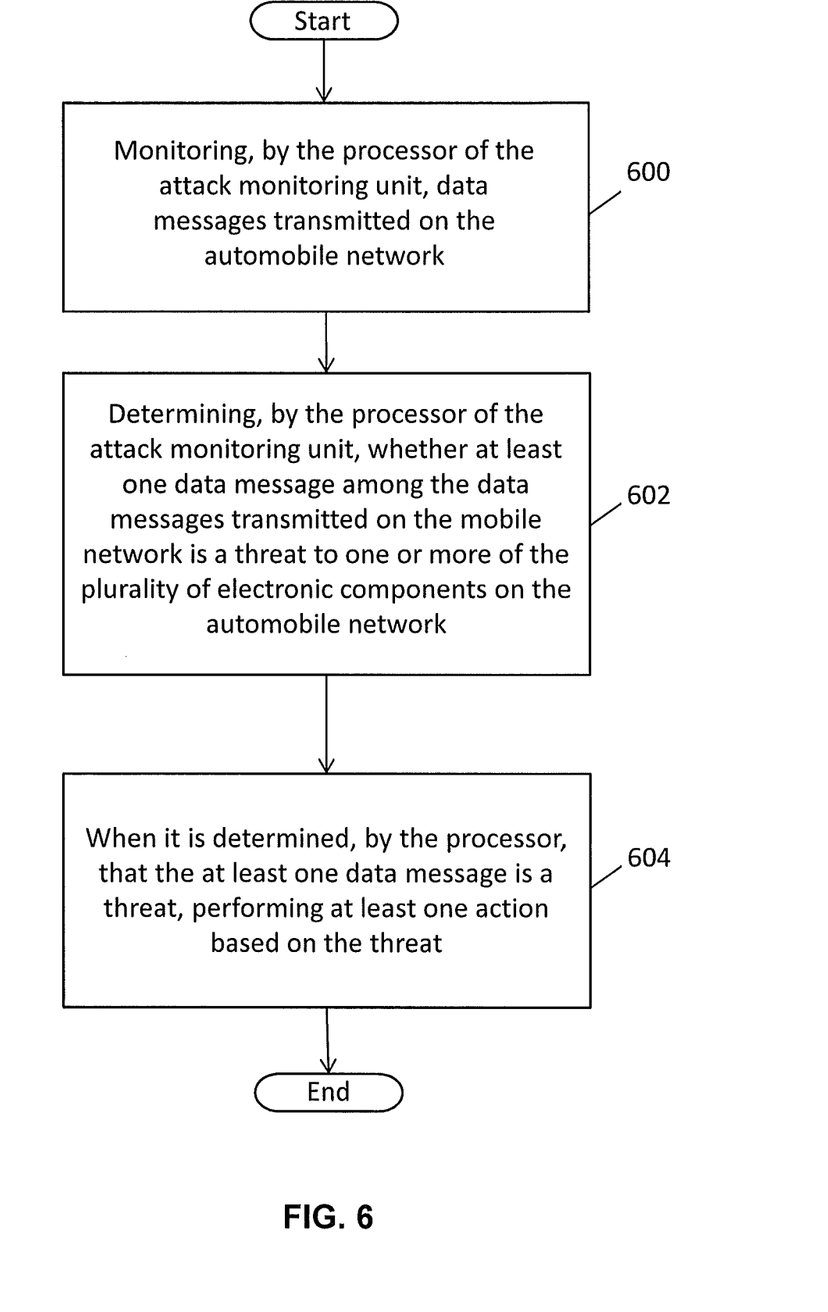
FIG. 6 is a flow chart illustrating an exemplary method of an embodiment.

FIG. 6 shows an exemplary method for detecting threats or attacks on an automobile network (e.g., CAN BUS 102). Step 600 includes monitoring, by the processor 202 of the attack monitoring unit 118, data messages (e.g., data messages 402, 404) transmitted on the automobile network 102. Step 602 includes determining, by the processor 202 of the attack monitoring unit 118, whether at least one data message (e.g., message 402) among the data messages (e.g., data messages 402, 404) transmitted on the automobile network 102 is a threat to one or more of the plurality of electronic components on the automobile network 102.

In step 604, when it is determined by the processor 202, that the at least one data message (e.g., data message 402) is a threat, performing at least one action based on the threat. In an exemplary embodiment, the at least one action that is performed is notifying the driver of the automobile of the threat. In an exemplary embodiment, the driver of the automobile can be notified of a threat by an audible alert that is produced or display of a warning indication on a dash of the automobile.

In an exemplary embodiment, the monitoring step 600 can include establishing a baseline of data message activity, and the determining step 602 can include comparing the at least one data message (for example, message 402) transmitted on the automobile network 102 to the baseline of data message activity.

In an exemplary embodiment, at least one threat identification data (e.g., CAN IDs 406, 408, 410) is stored in a memory (e.g., memory 204). The at least one threat identification data (e.g., CAN IDs 406, 408, 410) can be identification data (i.e., an ID) contained in a data message that is associated with a threat.

In an exemplary embodiment, during the determining step 602, identification data contained in the at least one data message transmitted on the automobile network 102 (e.g., data message 402) is compared to the at least one threat identification data that is stored (e.g., CAN IDs 406, 408, 410), and when the processor 202 determines that the identification data of the at least one data message 402 matches one of the at least one threat identification data (e.g., data messages 406, 408, 410) that is stored, it is determined that the at least one data message 402 is a threat.

In an exemplary embodiment, in the determining step 602, an operation state of an automobile containing the automobile network 102 is also used to determine whether at least one data message (e.g., data message 402) among the data messages transmitted (e.g., data messages 402, 404) on the automobile network 102 is a threat to one or more of the plurality of electronic components on the automobile network 102.

In an exemplary embodiment, when it is determined, by the processor 202, that the at least one data message is not a threat (e.g., data message 404), a transmission frequency of the at least one data message (e.g., data message 404) is compared to a frequency threshold. In an exemplary embodiment, when it is determined, by the processor 202, that the transmission frequency of the at least one data message (e.g., data message 404) exceeds the frequency threshold, the at least one data message (e.g., data message 404) is identified as a threat.

Figure 3:
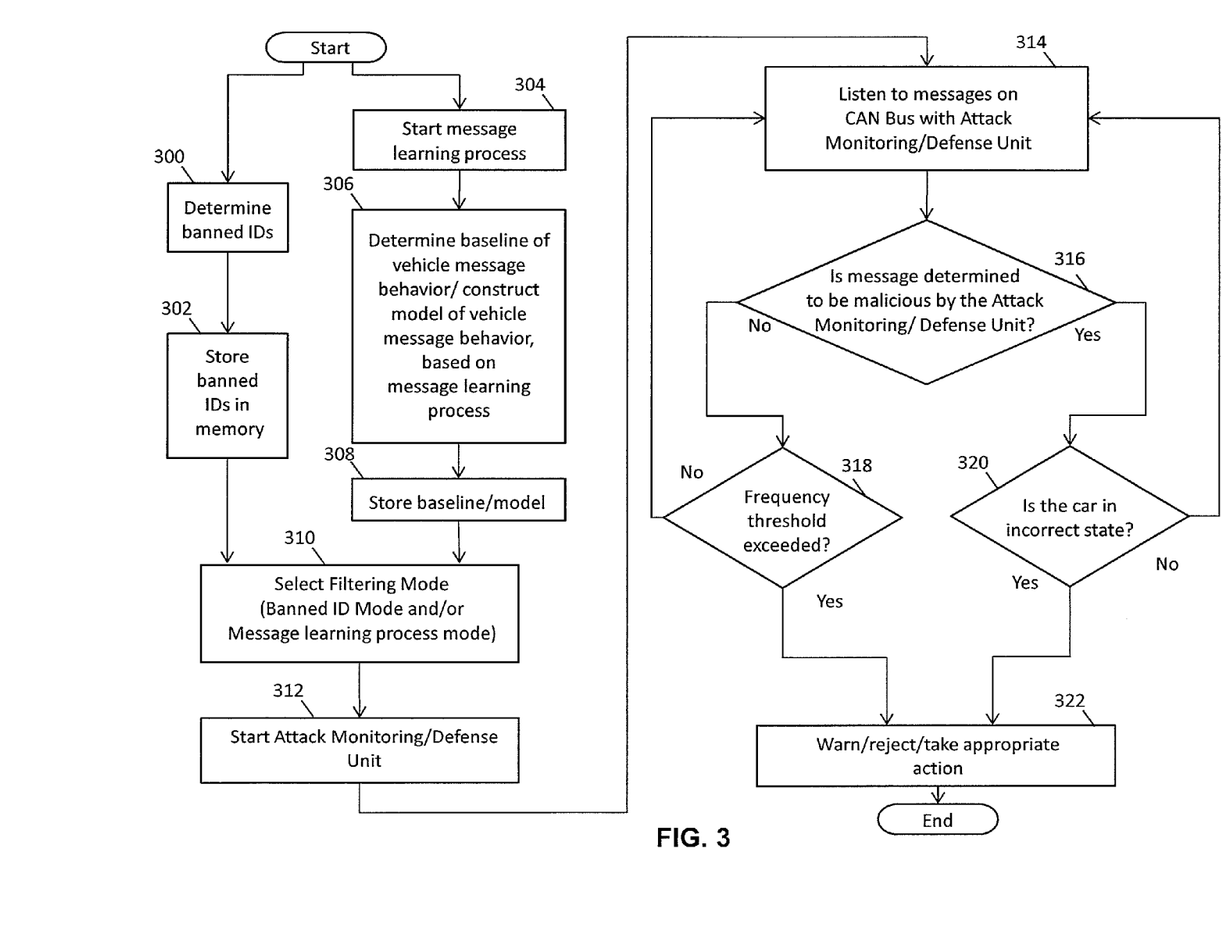
FIG. 3 is a flow chart illustrating an exemplary method of an embodiment.

FIG. 3 shows an exemplary method for detecting threats or attacks on an automobile network 102. In step 300, one or more banned CAN IDs are determined or provided. For example, a list of known malicious CAN IDs can be obtained. The banned IDs can be CAN IDs that are never observed, CAN IDs that have previously been identified as malicious, abnormal, etc. In step 302, the banned CAN IDs are stored in a memory. For example memory 204 or another memory. Alternatively, the banned CAN IDs can be pre-stored on the memory. In step 304, a message learning process is started by the attack monitoring unit 118. For example, the message learning process can include measuring the frequency of transmission of certain messages, tracking which kinds of messages are transmitted, etc. In step 306, a baseline of vehicle message behavior on the CAN BUS 102 is determined, and a model of the vehicle message behavior is constructed based on the message learning process. In an exemplary embodiment, the attack monitoring unit 118 can determine the baseline of the behavior and/or construct the model of the message behavior. In step 308, the baseline and the model are stored, for example in the memory 204 or another memory.

In step 310, a CAN message filtering mode is selected. For example, a banned ID filtering mode can be selected. In the banned ID filtering mode, messages that are transmitted on the CAN BUS 102 are compared with the banned IDs that are stored in the memory. For example, in FIG. 4, CAN IDs 406, 408, and 410 can be banned IDs. Also, a message learning process mode can be selected as the filtering mode. In the message learning process mode, messages that are transmitted on the CAN BUS 102 are compared to the baseline of vehicle message behavior and/or the constructed model of vehicle behavior that were determined in step 306. The banned ID mode and/or the message learning process mode can be selected in step 310.

In step 312, the attack monitoring unit 118 is started, and detection begins. In step 314, the attack monitoring unit 118 listens to messages transmitted on the CAN BUS 102. In step 316, the attack monitoring unit 118 determines whether a CAN message is malicious or not based on the selected filtering mode. If it is determined that the message is not malicious, in step 318, the transmission frequency of the CAN message on the CAN BUS 102 is compared with a frequency threshold that is stored and predetermined. If the frequency threshold is exceeded, the CAN message is determined to be abnormal or malicious, and in step 322 various actions can be taken based on the detected abnormal or malicious message. For example, in step 322, a warning can be generated that is displayed to the driver, the CAN message can be rejected (i.e., the message will be prevented from being transmitted further or the message will be made ineffective), or other appropriate action may be taken (e.g., the car can be slowed down, shut off, vehicle components can be operated in a certain way, etc.). If the frequency threshold is not exceeded, the CAN message is not determined to be abnormal or malicious, and the method proceeds back to step 314. In an exemplary embodiment, frequency thresholds are only determined by the attack monitoring unit 118 if this function is enabled.

In step 316, if the attack monitoring unit 118 determines that a CAN message is malicious or abnormal, in step 320, it is determined whether or not the automobile is in an incorrect state (e.g., a state that it should not be in based on the circumstances, a state that it should not be in relative to the CAN message that is under scrutiny, etc.). If it is determined in step 320 that the automobile is in the incorrect state, the method proceeds to step 322. If it is determined in step 320 that the automobile is in the correct state, the method proceeds back to step 314.

Attack Monitoring Unit Architecture

Turning now to FIG. 2, illustrated is the attack monitoring unit 118 in which embodiments of the present disclosure, or portions thereof, may be implemented as computer-readable code compiled on the attack monitoring unit 118, thus making it a specific purpose computer. For example, the attack monitoring unit 118 of FIG. 1 may be implemented as shown in FIG. 2 using hardware, software, firmware, non-transitory computer readable media having instructions stored thereon, or a combination thereof, and may be implemented in one or more computer systems or other processing systems. Hardware, software, or any combination thereof may embody modules and components used to implement the exemplary methods of FIGS. 3, 5, and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, and a hard disk installed in hard disk drive 212.

Various embodiments of the present disclosure are described in terms of the attack monitoring unit 118. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 202 may be a special purpose or a general purpose processor device. The processor device 202 may be connected to a communication infrastructure 206, such as a bus, message queue, network, multi-core message-passing scheme, etc. The attack monitoring unit 118 may also include a main memory 204 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. In one embodiment, the removable storage unit 218 may be non-transitory computer readable recording media.

In some embodiments, the secondary memory 210 may include alternative means for allowing computer programs or other instructions to be loaded into the attack monitoring unit 118, for example, the removable storage unit 218 and an interface 216. Examples of such means may include a program cartridge and cartridge interface (e.g., as found in video game systems), a removable memory chip (e.g., EEPROM, PROM, etc.) and associated socket, and other removable storage units 218 and interfaces 220 as will be apparent to persons having skill in the relevant art.

The attack monitoring unit 118 may also include a communications interface 208. The communications interface 208 may be configured to allow software and data to be transferred between the attack monitoring unit 118 and external devices. Exemplary communications interfaces 208 may include a modem, a network interface (e.g., an Ethernet card), a communications port, a PCMCIA slot and card, etc. Software and data transferred via the communications interface 208 may be in the form of signals, which may be electronic, electromagnetic, optical, or other signals as will be apparent to persons having skill in the relevant art. The signals may travel via a communications path 222, which may be configured to carry the signals and may be implemented using wire, cable, fiber optics, a phone line, a cellular phone link, a radio frequency link, etc.

Computer program medium and computer usable medium may refer to memories, such as the main memory 204 and secondary memory 210, which may be memory semiconductors (e.g., DRAMs, etc.). These computer program products may be means for providing software to the attack monitoring unit 118. Computer programs (e.g., computer control logic) may be stored in the main memory 204 and/or the secondary memory 210. Computer programs may also be received via the communications interface 208. Such computer programs, when executed, may enable a computer system, such as the attack monitoring unit 118, to implement the present methods as discussed herein. In particular, the computer programs, when executed, may enable processor device 202 to implement the method illustrated by FIGS. 3, 5, and 6 or a similar method, as discussed herein. Accordingly, such computer programs may represent controllers of the attack monitoring unit 118. Where the present disclosure is implemented using software, the software may be stored in a computer program product or non-transitory computer readable medium and loaded into the attack monitoring unit 118 using the removable storage drive 214, interface 216, hard disk drive 212, or communications interface 208.

The attack monitoring unit 118 has been described above as functioning on a CAN BUS of an automobile, however the attack monitoring unit 118 can also be used on other vehicles (e.g., earth movers, trucks, bull dozers, construction equipment, industrial machines, snowmobiles, ATVs, boats, etc.) in a similar manner.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for detecting threats or attacks on an automobile network, the automobile network connected to a plurality of electronic components and an attack monitoring unit including a processor, the method comprising:
   monitoring, by the processor of the attack monitoring unit, data messages transmitted on the automobile network and establishing a baseline of data message activity based on the monitoring of the data messages transmitted on the automobile network, wherein the data messages are transmitted on the automobile network via a Controller Area Network ("CAN") bus;
   determining, by the processor of the attack monitoring unit, whether at least one data message among the data messages transmitted on the automobile network is a threat to one or more of the plurality of electronic components on the automobile network by comparing the at least one data message transmitted on the automobile network to the established baseline of data message activity;
   wherein following the determining step, an operation state of the automobile containing the automobile network is also reviewed to evaluate whether the at least one data message among the data messages transmitted on the automobile network is a threat to one or more of the plurality of electronic components on the automobile network, wherein said operation state includes status of braking of the automobile, status of an engine of the automobile, position of a steering wheel of the automobile, and speedometer readout; and
   when it is determined, by the processor and the review of the operation state, that relative to the at least one data message the automobile is in an operation state that it should not be in, performing at least one action based on the threat.

2. The method for detecting threats or attacks as in claim 1, wherein the at least one action is notifying a driver of an automobile containing the automobile network of the threat.

3. The method for detecting threats or attacks as in claim 1, further comprising:
   storing at least one threat identification data in a memory, the at least one threat identification data is identification data contained in a data message that is associated with a threat; and
   during the determining, identification data contained in the at least one data message transmitted on the automobile network is compared to the at least one threat identification data that is stored, and when the processor determines that the identification data of the at least one data message matches the at least one threat identification data, it is determined that the at least one data message is a threat.

4. The method for detecting threats or attacks as in claim 1, wherein when it is determined, by the processor, that the at least one data message is not a threat, a transmission frequency of the at least one data message is compared to a frequency threshold.

5. The method for detecting threats or attacks as in claim 4, wherein when it is determined, by the processor, that the transmission frequency of the at least one data message exceeds the frequency threshold, the at least one data message is identified as a threat.

6. The method for detecting threats or attacks as in claim 2, wherein the notifying the driver of the automobile is producing an audible alert or producing a warning indication on a dash of the automobile.

7. A non-transitory computer-readable storage medium, storing instructions which when executed by a computer processor perform a method for detecting threats or attacks on an automobile network, the automobile network connected to a plurality of electronic components and an attack monitoring unit including a processor, the method comprising:
   monitoring data messages transmitted on the automobile network and establishing a baseline of data message activity based on the monitoring of the data messages transmitted on the automobile network, wherein the data messages are transmitted on the automobile network via a Controller Area Network ("CAN") bus;
   determining whether at least one data message among the data messages transmitted on the automobile network is a threat to one or more of the plurality of electronic components on the automobile network by comparing the at least one data message transmitted on the automobile network to the established baseline of data message activity;
   wherein following the determining step, an operation state of the automobile containing the automobile network is also reviewed to evaluate whether the at least one data message among the data messages transmitted on the automobile network is a threat to one or more of the plurality of electronic components on the automobile network, wherein said operation state includes status of braking of the automobile, status of an engine of the automobile, position of a steering wheel of the automobile, and speedometer readout; and when it is determined, by the review of the operation state, that relative to the at least one data message the automobile is in an operation state that it should not be in, performing at least one action based on the threat.

8. The non-transitory computer-readable storage medium of claim 7, wherein the at least one action is notifying a driver of an automobile containing the automobile network of the threat.

9. The non-transitory computer-readable storage medium of claim 7, further comprising:
storing at least one threat identification data in a memory, the at least one threat identification data is identification data contained in a data message that is associated with a threat; and
during the determining, identification data contained in the at least one data message transmitted on the automobile network is compared to the at least one threat identification data that is stored, and when it is determined that the identification data of the at least one data message matches the at least one threat identification data, it is determined that the at least one data message is a threat.

10. The non-transitory computer-readable storage medium of claim 7, wherein when it is determined that the at least one data message is not a threat, a transmission frequency of the at least one data message is compared to a frequency threshold.

11. The non-transitory computer-readable storage medium of claim 10, wherein when it is determined that the transmission frequency of the at least one data message exceeds the frequency threshold, the at least one data message is identified as a threat.

12. The non-transitory computer-readable storage medium of claim 8, wherein the notifying the driver of the automobile is producing an audible alert or producing a warning indication on a dash of the automobile.

13. An attack monitoring apparatus for detecting threats or attacks on an automobile network, the automobile network connected to a plurality of electronic components, the attack monitoring apparatus comprising:
a processor;
a memory;
a communication interface configured to send and receive data messages,
wherein the processor is configured to monitor data messages transmitted on the automobile network via a Controller Area Network ("CAN") bus and establish a baseline of data message activity based on the monitored data messages transmitted on the automobile network,
wherein the processor is configured to determine whether at least one data message among the data messages transmitted on the automobile network is a threat to one or more of the plurality of electronic components on the automobile network by comparing the at least one data message transmitted on the automobile network to the established baseline of data message activity,
wherein the processor is further configured to review an operation state of the automobile containing the automobile network following a determining step to evaluate whether the at least one data message among the data messages transmitted on the automobile network is a threat to one or more of the plurality of electronic components on the automobile network, wherein said operation state includes status of braking of the automobile, status of an engine of the automobile, position of a steering wheel of the automobile, and speedometer readout; and wherein when it is determined, by the processor and the review of the operation state that relative to the at least one data message the automobile is in an operation state that it should not be in, at least one action is performed based on the threat.

14. The attack monitoring apparatus of claim 13, wherein the at least one action is notifying a driver of the automobile of the threat.

15. The attack monitoring apparatus of claim 13, wherein the processor is configured to store at least one threat identification data in the memory, the at least one threat identification data is identification data contained in a data message that is associated with a threat, and
wherein when the processor determines whether at least one data message among the data messages transmitted on the mobile network is a threat to one or more of the plurality of electronic components, identification data contained in the at least one data message transmitted on the automobile network is compared to the at least one threat identification data that is stored, and when the processor determines that the identification data of the at least one data message matches the at least one threat identification data, it is determined that the at least one data message is a threat.

16. The attack monitoring apparatus of claim 13, wherein when the processor determines whether at least one data message among the data messages transmitted on the mobile network is a threat to one or more of the plurality of electronic components, an operation state of the automobile is also used to determine whether the at least one data message among the data messages transmitted on the automobile network is a threat to one or more of the plurality of electronic components on the automobile network.

17. The attack monitoring apparatus of claim 13, wherein when it is determined, by the processor, that the at least one data message is not a threat, a transmission frequency of the at least one data message is compared to a frequency threshold.

18. The attack monitoring apparatus of claim 17, wherein when it is determined, by the processor, that the transmission frequency of the at least one data message exceeds the frequency threshold, the at least one data message is identified as a threat.

19. The attack monitoring apparatus of claim 14, wherein the driver of the automobile is notified by an audible alert that is produced or a warning indication that is produced on a dash of the automobile.

20. A method for detecting threats or attacks on an automobile network, the automobile network connected to a plurality of electronic components of the automobile and an attack monitoring unit including a processor, the method comprising:
monitoring, by the processor of the attack monitoring unit, a Controller Area Network ("CAN") bus internal to the automobile network for data messages transmitted on the automobile network;
determining, by the processor of the attack monitoring unit, whether at least one data message among the data messages transmitted on the automobile network is a threat to one or more of the plurality of electronic components on the automobile network by determining whether the automobile is in an operation state it should not be in based on the circumstances; and, wherein said operation state includes status of braking of the automobile, status of an engine of the automobile, position of a steering wheel of the automobile, and speedometer readout; and when it is determined, by the processor and the review of the operation state, that relative to the at least one data message the automobile is in an operation state that it should not be in, performing at least one action based on the threat.

21. A method for detecting threats or attacks on an automobile network, the automobile network connected to a plurality of electronic components and an attack monitoring unit including a processor, the method comprising: monitoring, by the processor of the attack monitoring unit, data messages forming Controller Area Network ("CAN") bus traffic that are transmitted on the automobile network; determining, by the processor of the attack monitoring unit, whether at least one data message among the data messages transmitted on the automobile network is a threat to one or more of the plurality of electronic components on the automobile network by comparing a transmission frequency of the at least one data message to a frequency threshold;

wherein following the determining step, an operation state of the automobile containing the automobile network is reviewed to evaluate whether the at least one data message among the data messages transmitted on the automobile network is a threat to one or more of the plurality of electronic components on the automobile network, wherein said operation state includes status of braking of the automobile, status of an engine of the automobile, position of a steering wheel of the automobile, and speedometer readout; and when it is determined, by the processor and the review of the operation state, that relative to the at least one data message the automobile is in an operation state that it should not be in, performing at least one action based on the threat.

22. The method for detecting threats or attacks as in claim 1, further comprising: constructing, by the attack monitoring unit, a model of message behavior based on the established baseline of data message activity.

23. The method for detecting threats or attacks as in claim 1, further comprising filtering the at least one data message and selection of a filtering mode by which the at least one data message is filtered.

24. The method for detecting threats or attacks as in Claim 23, wherein the at least one data message that is filtered is never observed by the attack monitoring unit.

25. The method for detecting threats or attacks as in claim 4, wherein the transmission frequency of the at least one data message is compared to a frequency threshold after it has been determined that the at least one data message is not a threat.

* * * * *